United States Patent [19]

Larabell et al.

[11] Patent Number: 5,641,296

[45] Date of Patent: Jun. 24, 1997

[54] FOLDING HANDLE CARRIER ASSEMBLY

[75] Inventors: Henri J. Larabell, Cupertino, Calif.; Thomas Knoll, Surry, Canada

[73] Assignee: HJS&E Engineering, Inc., Sunnyvale, Calif.

[21] Appl. No.: 363,478

[22] Filed: Dec. 23, 1994

[51] Int. Cl.$^6$ .................................................. H01R 13/62
[52] U.S. Cl. ........................ 439/342; 439/157; 439/160
[58] Field of Search .................................... 439/157, 160, 439/310, 342, 343, 372, 376

[56] References Cited

U.S. PATENT DOCUMENTS

| | | | |
|---|---|---|---|
| 5,427,540 | 6/1995 | Taguchi | 439/160 X |
| 5,434,752 | 7/1995 | Huth et al. | 439/160 X |
| 5,445,530 | 8/1995 | Inoue et al. | 439/160 X |
| 5,481,431 | 1/1996 | Siahpolo et al. | 439/160 X |

OTHER PUBLICATIONS

Enclosed sketch of carrier manufactured by Sun Microsystems, Inc. of Mountain View, California.

*Primary Examiner*—Khiem Nguyen
*Attorney, Agent, or Firm*—Peninsula IP Group; Douglas A. Chaikin, Esq.

[57] ABSTRACT

A carrier assembly connects a memory storage device with electrical equipment having a slide. The carrier assembly includes a carrier adapted for holding a memory storage device and a folding handle. The folding handle has two arms which normally extend from the carrier. Each arm has an end rotatably attached to the carrier. Each end has a cam member, a biasing member and a locking member. The handle normally stands in an upright position with respect to the carrier, but can rotate to a folded position. The cam member is attached to the end of each arm to urge against the slide to move the carrier with respect to the slide and electrically connect the memory storage device with the electrical equipment when the handle is in the folded position. The locking member attaches to each cam member and engages with the side of the carrier to lock the handle when the handle is in the folded position.

2 Claims, 5 Drawing Sheets

FOLDING HANDLE CARRIER ASSEMBLY

BACKGROUND OF THE INVENTION

1. Field of the Invention

This invention relates to removable carriers which interconnect memory storage devices with computers. More particularly, this invention relates to folding handle carrier assemblies.

2. Previous Art

Computer memory storage devices have changed since the inception of the floppy disk drive in the early 1970's. Optical disk drives, hard disk drives and digital tape drives are examples of currently used memory storage devices. The development of such memory storage devices and related systems has been instrumental in increasing data storage capacity as well as data storage and recall speed.

Floppy disk drives are especially useful for transferring computer work product from one personal computer (PC) to another. Unlike work product transferred via hard copy, the work product transferred via floppy disk does not have to be re-created by a keyboard operator for example. Multiple users, each at a different PC, may modify the computer work product until the work product is complete. This increases computer user efficiency.

Floppy disk drives have limited capacities. Early floppy disk drives had a storage capacity of 360 kilobytes. Subsequent versions had capacities of 720 kilobytes and 1.2 megabytes. There are now floppy disk drives having storage capacities of 2.88 megabytes. These greater capacity floppy disk drives are smaller and faster than the early floppy disk drives. It is expected that even greater capacity memory storage devices will be available in the near future.

Hard disk drives have greater storage capacities than floppy disk drives. Hard disk drives typically recall and store data more rapidly than a floppy disk drive. This is typically why hard drives are preferred. Most PC's, for example, include a hard disk drive which provides considerable storage capacity. Because hard disk drives generally are not easily removable, PC's typically include at least one floppy disk drive. This facilitates the transfer of data from one PC to another. Unfortunately, increased demand for data transfer capabilities has outpaced floppy disk drive capabilities. For example, floppy disk drives having a 2.88 megabyte storage capacity can not rapidly transfer large amounts of data (e.g. 1 gygabyte) between PC's as is often desired.

The problem of increasing data transfer capabilities is not limited to PC's. The same difficulty is faced with work stations and main frame computers. Accordingly, systems having removable hard disk drives have evolved to enable the transfer of large amounts of data. Workstations such as the Sun®, and others, use removable hard disk drives to transfer data. Such systems also have improved computing power and speed over PC based computers with far less cost than main frame computers. Such workstations are becoming increasingly more cost effective and therefore more popular.

Work stations often rely upon multiple memory storage devices. One way of housing these multiple memory storage devices and connecting these devices to a work station computer is with a "shoe box". A shoe box is an enclosure which houses many memory storage devices. These devices are stacked in close proximity and electrically connected within the shoe box.

One of the remarkable capabilities that can be gained from using a shoe box is the ability to remove a memory storage device while the computer system continues operation. This capability is known as "hot swapping". Hot swapping enables computer systems to continue operation while memory storage devices are removed, replaced or exchanged.

Removal, replacement or exchange of memory storage devices must be done with great care. The installation and exchange of such electrical devices can cause the electrical connections to become damaged, sometimes beyond minor repair. Replacement of an entire mother board or a controller may be required in cases of severe damage. To avoid damage to the electrical connectors, alignment of the connectors of different electrical devices with the host computer or the shoe box must be precise.

Typically, a shoe box includes an equipment slide which receives the carrier during hot swapping. The equipment slide guides the carrier into the shoe box so that electrical connectors on the memory storage device and in the shoe box align. Still, electrical connectors sometimes misalign and become damaged. What is needed is a carrier which provides improved alignment between a carrier and an equipment slide.

After the carrier mates with the equipment slide, and the respective electrical connectors align, relative movement between the carrier and the equipment slide is still possible. Such movement is the result, in part, of high frequency vibrations generated from the memory storage device attached to the carrier. Over time, relative movement may misalign and damage the electrical connectors. What is needed is a carrier which securely locks with the equipment slide to prevent relative movement between the equipment slide and the carrier.

A variety of locking mechanisms have been developed for various carrier configurations. A carrier developed by Sun Microsystems Inc., for example, has a base, a folding handle with a handle grip and a plastic hook-shaped lock attached at the handle grip. The carrier supports a memory storage device with an electrical connector. The base has an extended end which opposes the electrical connector. The lock snaps with the extended end of the base when the handle folds against the base. The lock and the extended end of the base consumes valuable space. What is needed is a carrier which conserves space.

Various memory storage devices have varying heights (e.g. standard capacity hard disks, low profile hard disks, etc.). To accommodate the various memory storage device configurations, the handle length must be long enough to enable the handle to fold over the memory storage device. In the past, a folding handle carrier having a handle configured for attachment to a low profile disk drive would not be compatible with a larger standard profile disk drive. (The term "profile" describes the height of the disk drive.) Accordingly, folding handle carriers which rely on a handle lock at one end of the base of carrier are not adapted for use with both low profile disk drives and disk drives with the standard configuration. In each application, a separately configured carrier must be used. What is needed is a folding carrier which does not rely on a lock at one end of the base and which can accommodate various memory storage device configurations.

SUMMARY AND OBJECTS OF THE INVENTION

The following objects of the invention, and those that will become apparent below, are provided by way of example. The invention is to be limited in scope only by the appended claims.

It is an object of the invention to provide a carrier assembly which aligns a carrier with an equipment slide It is another object of the invention to provide a carrier assembly which locks with the equipment slide to prevent relative movement between the equipment slide and the carrier.

Accordingly, a carrier assembly for connecting an electrical device with electrical equipment having a slide is provided comprising:

a carrier having a base adapted for holding the electrical device;

a folding handle having two arms, the handle extends from the carrier in an upright position, each arm having an end rotatably attached to the carrier to permit rotation of the handle from the upright position to a folded position;

a cam member attached to the end of each arm, each cam member being shaped to urge against the slide when the handle rotates; and a biasing member attached to the cam member, the biasing member normally urges against the carrier, whereby, when the handle rotates between the upright position and the folded position, the biasing member aligns the cam member with the slide, the cam member urges against the slide to move the carrier and connect the electrical device with the electrical equipment.

In an embodiment of the present invention, the handle is flexible. The biasing member urges against the carrier to flex the handle and hold the handle against the carrier.

In another embodiment, each cam member includes a locking member. The handle flexes when the handle attaches to the carrier to urge each locking member against the carrier. Each locking member locks against the carrier to hold the handle in the upright position and in the folded position. When the handle is in the folded position the carrier locks with the slide and the electrical device electronically connects with the electrical equipment.

In another embodiment, the carrier includes a spacer guide. The biasing member slides along the spacer guide to bias the handle and to guide the handle along to the carrier and against the slide when the handle rotates.

In another embodiment, the slide has walls which align with and extend perpendicularly from the base of the slide. The biasing member includes two spacers. One spacer urges against one wall of the slide to move the carrier when the handle rotates from the folded position to the upright position. The other spacer urges against another wall of the slide to move the carrier when the handle rotates from the upright position to the folded position.

In another embodiment the carrier has a lock guide. Each locking member has a lock pin. Each lock guide has a first lock hole and a second lock hole for receiving the lock pin. The first lock hole receives the lock pin when the handle is in the folded position and the second lock hole receives the lock pin when the handle is in the upright position.

In another embodiment having a lock guide, the lock guide has a linking member defined adjacent and each lock hole. The lock pin of the locking member being engageable with the linking member when the handle rotates to flex the handle and to guide the pin into the adjacent lock hole.

In another embodiment, the linking member has a rounded surface. When the handle rotates and the lock pin engages the linking member, the rounded surface contacts the lock pin to urge the ends of the handle apart and guide the lock pin into the adjacent lock hole.

In another embodiment, the linking member has beveled edges.

It is an advantage of the present invention to provide a carrier which precisely aligns a carrier with an equipment slide.

It is another advantage of the invention to provide a carrier which securely locks with the equipment slide to prevent relative movement between the equipment slide and the carrier.

It is still another advantage of the invention to provide a carrier which consumes a minimal amount of space.

It is yet another advantage of the invention to provide a carrier which is adapted to support a variety of memory storage devices, and a variety of memory storage device configurations.

It is an advantage the invention to provide a folding handle carrier which does not rely on a handle lock positioned at one end of the carrier base.

BRIEF DESCRIPTION OF THE DRAWINGS

For a further understanding of the objects and advantages of the present invention, reference should be had to the following detailed description, taken in conjunction with the accompanying drawings, in which like parts are given like reference numerals and wherein.

DETAILED DESCRIPTION OF THE INVENTION

Figure 1:
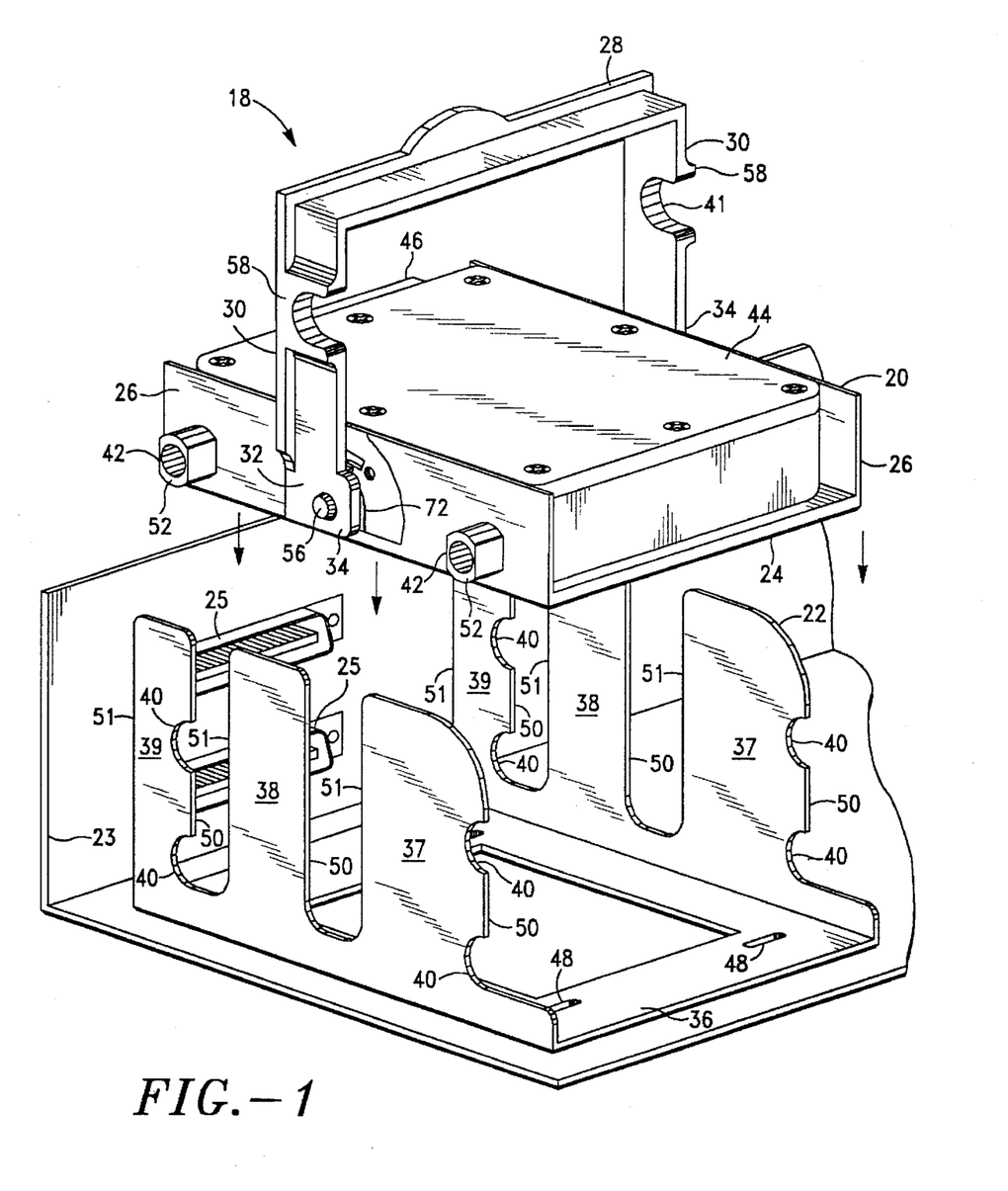
FIG. 1 is a perspective view of the carrier of the present invention positioned adjacent to a slide.

The invention will now be described with respect to FIG. 1 which illustrates, in an exploded perspective view, the apparatus of the present invention, generally designated by the reference numeral 18. The apparatus 18 connects a memory storage device 44, or other electrical device (e.g. a circuit board) with electrical equipment 23. The apparatus 18 is capable of aligning the memory storage device with the electrical equipment 23. The apparatus 18 of the present invention includes a slide 22 and a carrier 20. The slide 22 mounts on electrical equipment 23. A memory storage device 44 mounts on the carrier 20. The memory storage device 44 has an electrical connector 46. The electrical equipment 23 has electrical connectors 25.

The carrier 20 has a folding handle 28. The folding handle 28 attaches to the carrier 20 and rotates to lock the carrier 20 with the slide 22. The electrical connector 46 of the memory storage device 44 connects with one electrical connector 25 of the electrical equipment 23 when the carrier 20 locks with the slide 22.

The carrier 20 has a base 24 and sides 26. The sides 26 of the carrier 20 extend perpendicularly from the base 24. The base 24 and the sides 26 of the carrier 20 hold the memory storage device 44.

The slide 22 has a base 36, walls 37, 38 and 39. The walls 37 and 39 define slots 40. The slide 22 can be incorporated in a shoe box of a computer system having multiple electrical connectors 25, for example. As shown, the slide 22 is configured to support two carriers 20, one above the other. Each wall 37–39 of the slide 22 align with and extends perpendicularly from the base 36 of the slide 22 to guide the carrier 20 on to the base 36 of the slide 22. The base 36 defines fastener holes 48 which permit attachment of the slide 22 to the electrical equipment 23.

The folding handle 28 has a pair of handle arms 30. Each handle arm 30 has an end 34. A cam member 32 is formed as a part of each end 34. Each end 34 of the folding handle 28 rotatably attaches on a respective side 26 of the carrier 20. Rotation of the handle 28 selectively urges the cam member 32 against the walls 37 and 38 of the slide 22 to reciprocate the carrier 20 with respect to the slide 22. Reciprocation of the carrier 20 selectively connects and disconnects the electrical connector 46 of the memory storage device 44 with the electrical equipment 23.

The sides 26 of the carrier 20 includes protuberances 42 and a shaft 56 which extend perpendicularly from each side 26. The protuberances 42 are rigid, being configured to fit within the slots 40 of the slide 22. Each protuberance 42 is hollow and defines a portion of a fastener hole 52 of the carrier 20 to support a fastener and facilitate rigid attachment of an electrical device such as the memory storage device 44 to the carrier 20. The fastener holes 52 are round to receive fasteners such as machine screws, bolts and the like (not shown) which secure the memory storage device 44 on the carrier 20.

The shaft 56 extends from each side 26 midway between the protuberances 42 to connect with the handle 28.

The base 24, sides 26 and the protuberances 42 of the carrier 20 are rigid, being fabricated from a rigid material (e.g. a fiberglass-polycarbonate composite) and do not deform when the slide 22 supports the carrier 20. Each side 26 of the carrier 20 is about the same height as the memory storage device 44. For example, a standard 3-½ inch hard disk drive has a height of about 1.6 inches. "Low profile" hard disk drives have a height of approximately 1 inch. The carrier 20 has sides of a height within the range of about 1 inch to 1.6 inches to accommodate standard and low profile disk drives, or other electrical devices. Preferably, the carrier 20 has sides 26 of about 1 inch high and a handle 28 having handle arms 30 which extend beyond the memory storage device 44 when the handle 28 folds. Accordingly, the carrier 20 is adaptable to accommodate various memory storage device configurations.

The electrical connector 46 of the memory storage device 44 precisely aligns and connects with one electrical connector 25 of the electrical equipment 23 when the carrier 20 locks with the slide 22. Precise alignment of the electrical connector 46 with the electrical connector 25 of the equipment 23 minimizes the possibility of damaging the electrical connectors 25 and 46 during interconnection. It can be appreciated that the memory storage device 44 can be any of a number of devices such as a hard disk drive, an optical disk drive, or a magnetic tape device. The electrical equipment may be a variety of equipment types, for example, a computer system. The present invention is also useful for attaching electrical devices other than memory storage devices (e.g. circuit boards) to various types of electrical equipment.

The handle 28 normally extends perpendicularly from the base 24 of the carrier 20, achieving an upright position as shown. In the upright position, the handle 28 balances the carrier 20 during placement of the carrier 20 on the slide 22, and during transport of the carrier 20 away from the slide 22. The carrier 20 is configured for vertical placement on to the slide 22 as shown by the arrows. During such vertical placement of the carrier 20 on the slide 22 the walls 37–39 of the slide 22 guide the carrier 20 on to the base 36 of the slide 22 to prevent damage to the electrical connectors 25 and 46.

Figure 2:
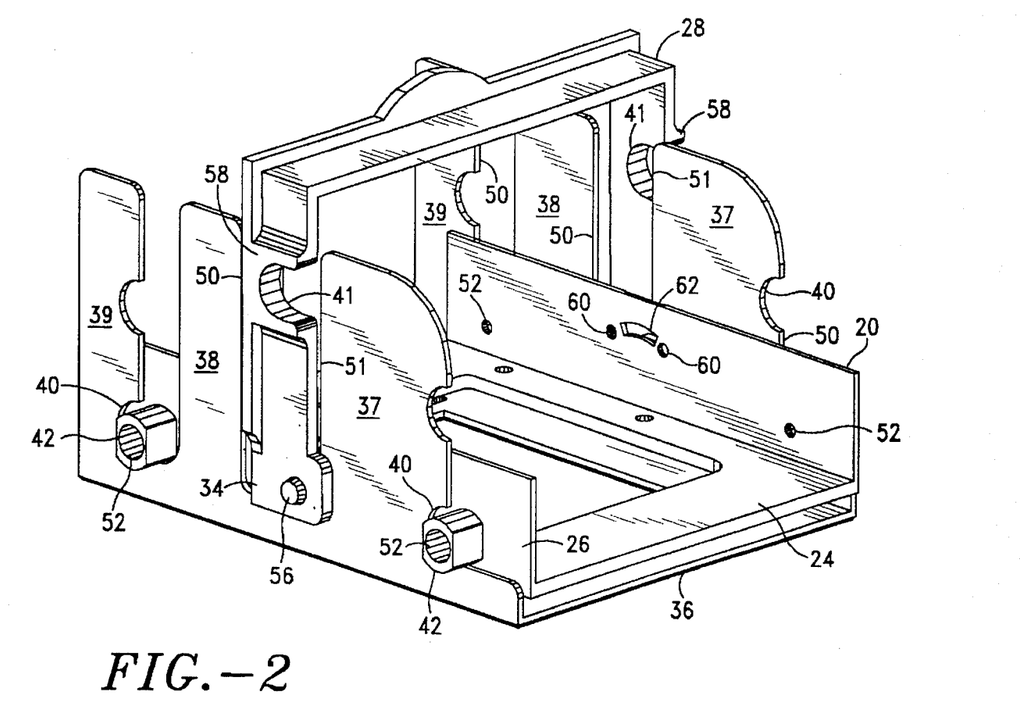
FIG. 2 is a perspective view of the carrier and slide of FIG. 1 with the carrier positioned on the slide.

FIG. 2 shows the slide 22 supporting the carrier 20. Each protuberance 42 of the carrier 20 is positioned adjacent a respective slot 40 of the slide 22. The slide 22 receives the shaft 56 of the carrier 20 between the rear edge 51 of the wall 37 and the forward edge 50 of the wall 38. A portion of the wall 37 extends from the base 36 of the slide 22 between the end 34 of the handle 28 and the side 26 of the carrier 20.

Each handle arm 30 is generally flat and has a reinforced portion 58 having a slot 41. The reinforced portion 58 is thicker than the remainder of the handle arm 30. The slot 41 is arcuate in shape to interconnect with a protuberance 42 of the carrier 20. The length of each handle arm 30 is adapted to permit rotation of the handle 28 over the walls 37 of the slide 22 and the sides 26 of the carrier. Accordingly, a memory storage device mounted on the carrier 20 and having approximately the same height of the carrier 22 will not interfere with the handle 28 when the handle 28 rotates.

Figure 3:
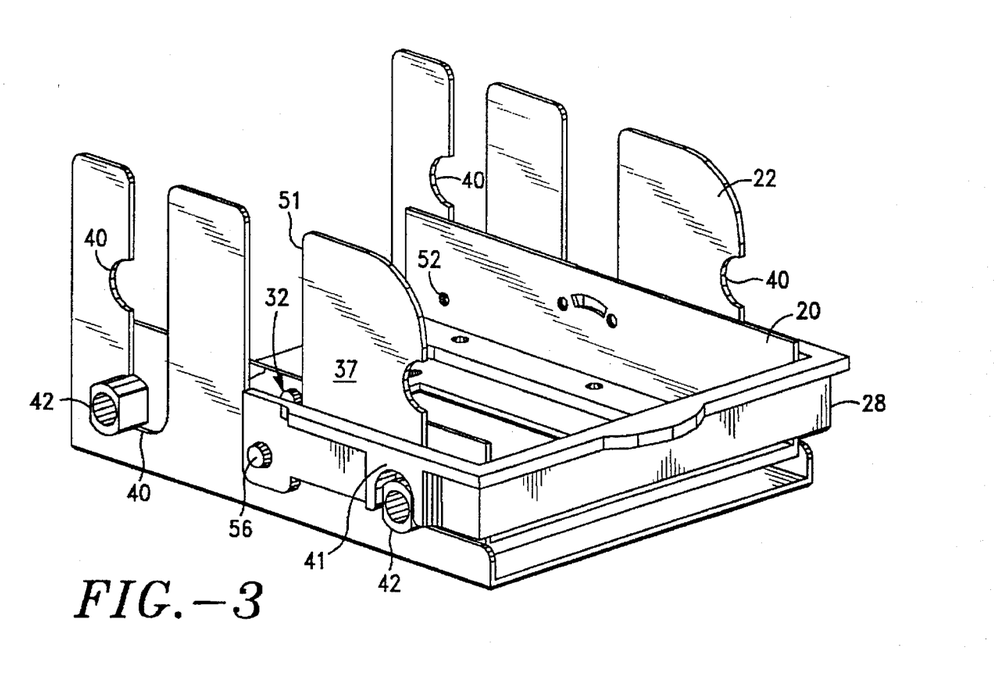
FIG. 3 is a perspective view of the carrier and the slide of FIG. 1 with the carrier locked with the slide.

FIG. 3 shows the carrier 20 locked with the slide 22. The handle 28 occupies a folded position, lying parallel with the base 24. The cam member 32 urges against the rear edge 51 of the wall 37 of the slide 22 to urge the protuberances 42 of the carrier 20 into the slots 40 of the slide. The protuberances 42 of the carrier 20 lock into the slots 40 of the slide 22 to hold the carrier 20 with the slide 22. Each slot 41 of the handle 28 locks over a protuberance 42 when the handle 28 folds.

Figure 4:
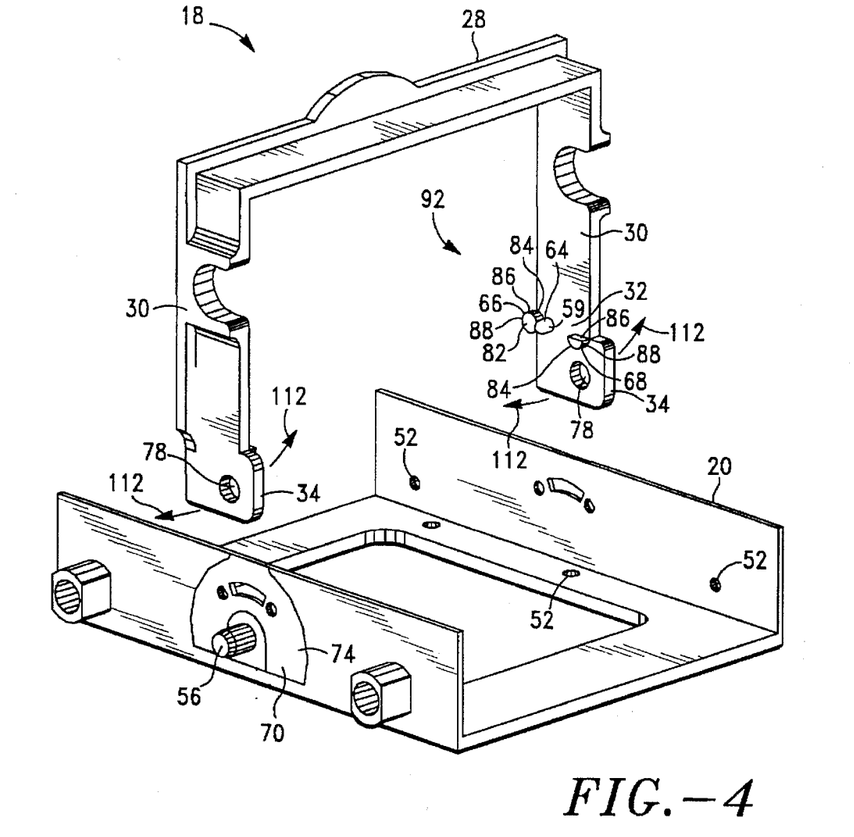
FIG. 4 is an exploded perspective view of the carrier of FIG. 1.

FIG. 4 shows the biasing member shown generally at numeral 92. Each handle arm 30 includes an inner surface 82. Each cam member 32 is formed on the inner surface 82 at each end 34 of the handle 28. The biasing member 92 is formed as part of the cam member 32. The cam member 32 includes a locking member 59.

The locking member 59 is formed having a lock pin 64. The lock pin 64 rotates with the cam member 32 and moves with the biasing member 92 along an arcuate path when the handle 28 rotates about the shaft 56 of the carrier 20.

The biasing member 92 rotates with the cam member 32 and slides along the spacer guide 74 to bias the handle 28 in a flexed position. The biasing member 92 urges against the handle ends 34 and the sides 26 of the carrier 20 to distance the handle ends 34 from the sides 26 of the carrier 20. The biasing member 92 guides the handle 28 along the spacer guide 74 to maintain contact between the biasing member 92 and the edges 51 and 50 of each wall 37 and 38 of the slide 30 respectively.

Figure 5:
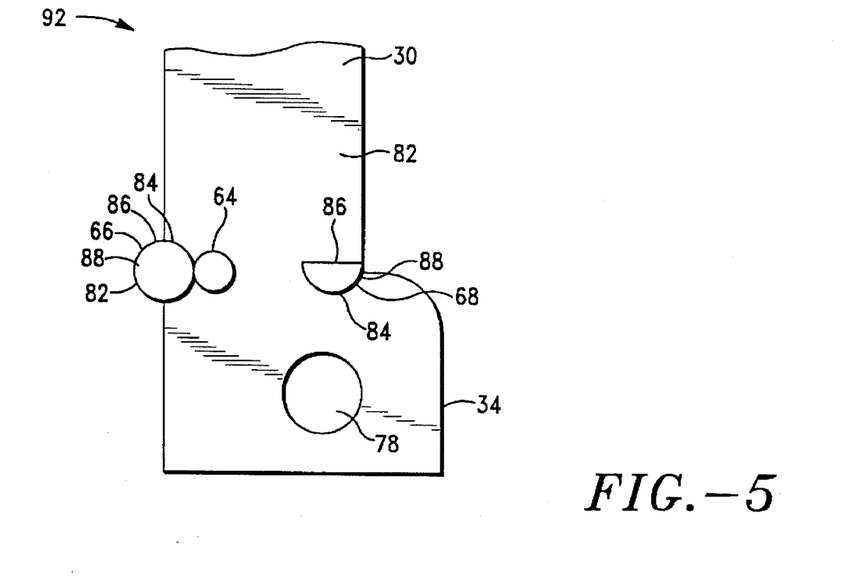
FIG. 5 is a side view of the end of the handle of FIG. 4.

The biasing member is shown in a side view in FIG. 5, generally designated by the reference numeral 92. The biasing member includes spacers 66 and 68. Each spacer 66 and 68 is configured having a head 84, a length 86, and an edge 88. The head 84 of each spacer 66 and 68 is flat to smoothly slide align the recessed portion 70 of the carrier 20 and to distance each arm 30 of the handle from the carrier 20. The edge 88 of each spacer 66 and 68 surrounds the flat head 84.

Referring to FIG. 4 and FIG. 5, the edge 88 of each spacer 66 and 68 engages the spacer guide 74 to guide the handle 28 of the carrier 20 when the handle 28 rotates.

The length 86 of each spacer 66 and 68 is uniform to cause the head 84 of each spacer 66 and 68 to evenly contact the recessed portion 70 to flex the handle 28 and to bias the handle ends 34 against the carrier 20 to hold the handle 28 on the carrier 20. Biasing the handle ends 34 flexes the handle 28 to urge the lock pin 64 against the lock guide 62, and the lock holes 60. The length 86 of each spacer 66 and 68 selectively urges against the forward edge 51 and the rear edge 50 of the wall 38 and 39 of the slide respectively when the handle rotates to reciprocate the carrier 20 with respect to the slide 22 (see FIGS. 1-3).

The shaft 56 has a smooth surface. Each end 34 of handle 28 has a bearing 77 having a bearing hole 78. The shaft 56 is configured to insert into the bearing hole 78 to rotatably attach the handle 28 with the carrier 20.

Each handle arm 30 of the handle is flexible and flexes in the directions shown by the arrows 112. The handle 28 is removable from the carrier 20 when the handle ends 34 flex apart from the carrier 20. Compressive force generated by the handle 28 when the handle 28 flexes normally holds the handle 28 on the carrier 20.

The carrier 20 is fabricated from a composite material having a substrate selected from the group known as polycarbonates. A reinforcing material is combined with the substrate. The reinforcing material is selected from the group of materials known as fiber glass. Preferably, the carrier is fabricated from a composition of poly carbonate with 15-25 percent long fiber glass. More preferably, the carrier is fabricated from about 20 percent long fiber glass. In a variation of the present invention, the reinforcing material is a metal composition in particle form (e.g. a polycarbonate-stainless steel fiber composite.

Figure 6:
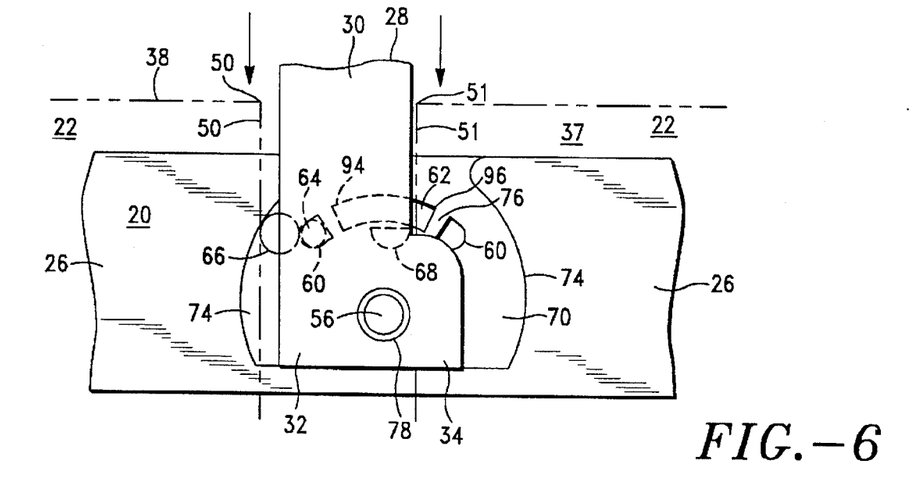
FIG. 6 is a side view of the end of the handle arm of FIG. 2, with the slide of FIG. 2 shown with phantom lines.
Figure 7:
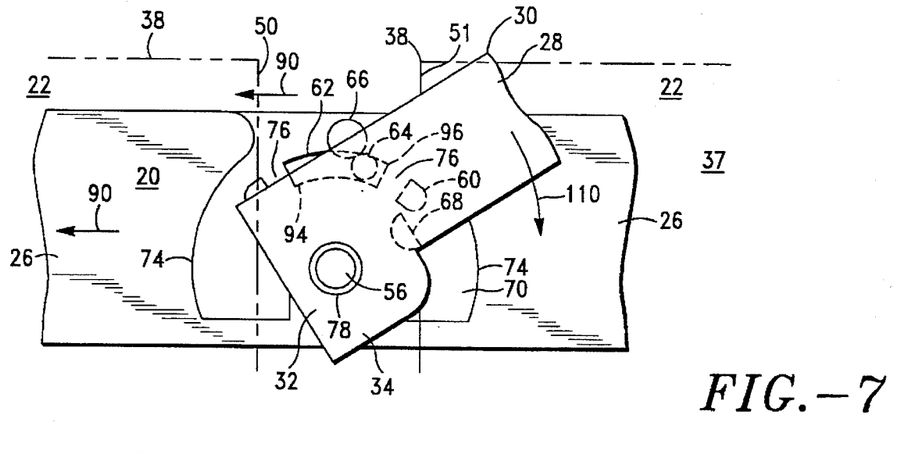
FIG. 7 is a side view of the end of the handle arm of FIG. 2, with the handle arm partially folded and the slide of FIG. 2 shown with phantom lines.
Figure 8:
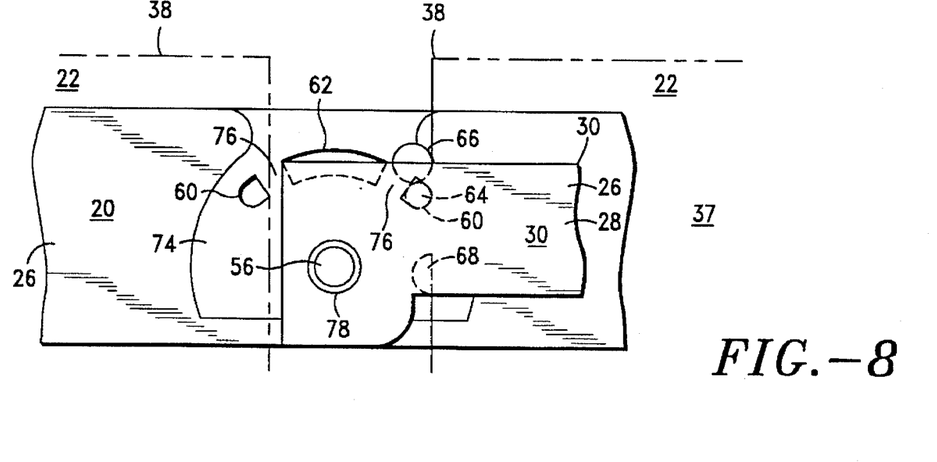
FIG. 8 is a side view of the handle arm of FIG. 3, with the slide of FIG. 3 shown with phantom lines.

FIGS. 6-8 show the handle 28 of the present invention in various stages of rotation with respect to the carrier 20. The slide 22 is shown in phantom lines. The side 26 of the carrier 20 includes a recessed portion 70 having lock holes 60, a lock guide 62 and a linking member 76. The recessed portion 70 has an arcuate periphery which defines a spacer guide 74. The shaft 56 extends from the recessed portion 70. The recessed portion 70 and the handle end 34 define a space 72 (see FIG. 1) for receiving the walls 38 of the slide 22.

The lock guide 62 is a arc shaped and has two ends 94 and 96. The lock guide 62 extends along the recessed portion 70 and through the side 26 carrier 30. One lock hole 60 is positioned adjacent each end of the lock guide 62. Each lock hole 60 extends through the carrier. Although the lock guide 62 and each lock hole 60 cut through the carrier 20, various shapes and configurations of each may be used in accordance with the present invention. For example, the lock holes 60 and a lock guide 62 may be etched partially through the carrier 20, or extend outwards from the carrier 20 to lock the handle 28 with the carrier 30.

The linking member 76 separates the lock guide 62 and each lock hole 60. When the handle 28 rotates and the lock pin 64 engages the linking member 76, each end 34 of the handle 28 slides axially along each respective shaft 56. The handle ends 34 slide along the shafts 56 in a direction away from the sides 26 of the carrier 20 to permit the arms 30 of the handle 28 to flex.

The spacer 66 has a circular cross-section while the spacer 68 has a semi-circular cross-section. The spacers 66 and 68 align with the lock pin 64 across the end 34 of the handle 28.

FIG. 6 shows the handle in the upright position as seen in FIG. 2. The lock pin 64 inserts into the lock hole 64 to hold the handle 28. The spacer 66 urges against the recessed portion 70 of the slide 22 to bias the handle arm 30 away from the side 26 of the carrier 22. The spacer 66 contacts the spacer guide 74 to guide the handle 28 during rotation. The spacer 68 contacts the rear edge 51 of the wall 37 of the slide 22.

FIG. 7 shows the handle 28 positioned between the upright position of FIG. 2 and the folded position of FIG. 3. The lock pin 64 inserts into the lock guide 62 and slides along the lock guide 62 as the handle 28 rotates. The spacer 66 slides with the spacer guide 74 of the recessed portion 70. The spacer 68 urges against the rear edge 51 of the wall 37 of the slide to urge the carrier 20 in the direction of the arrows 90.

As the handle 28 rotates as shown by the arrow 110, it can be appreciated that the lock pin 64 contacts the linking member 76. The linking member 76 urges against the lock pin 64 to flex the handle arms 30. Each end 34 of the handle 28 axially translates along the shaft 56 outward from the carrier 20 when the arms 30 of the handle 28 flex. The spacers 66 and 68 separate from the recessed portion 70. The spacer 68 remains in continuous contact with the edge 51 of the slide 22 when the lock pin 64 contacts the linking member 76. The linking member 76 guides the lock pin 64 securely into the lock hole 60 to lock the carrier 20 with the slide 22.

The spacers 66 and 68 normally contact the recessed portion 70. The edges 50 and 51 of the slide 22 have a thickness of between one and ten millimeters. Contact between the edge 51 and the spacer 68 prevents contact between the lock pin 64 and the edge 51 during handle 28 rotation to prevent lock pin wear. Likewise, the spacer 66 contacts the edge 50 of the slide 22 when the handle 28 reciprocally rotates.

When the spacer 68 contacts the rear edge 51 of the wall 37 of the slide 22, and the handle 28 rotates in the direction of the arrow 110, the carrier 20 moves in the direction of the arrows 90. When the handle 28 rotates in the direction opposing the arrow 110, the spacer 66 contacts the forward edge 50 of the wall 39 of the carrier 20 and urges the carrier 20 in a direction opposing the arrows 90.

FIG. 8 illustrates the handle 28 (FIG. 3) in the folded position. The spacers 66 and 68 align with the rear edge 51 of the wall 37 of the slide 22 and lock the carrier 20 with the slide 22. The lock pin 64 of the handle 28 locks the handle in the lock hole 60. When the handle 28 is in the folded position, the electrical connector 46 of the memory storage device 44 connects with the electrical equipment (not shown).

Figure 9:
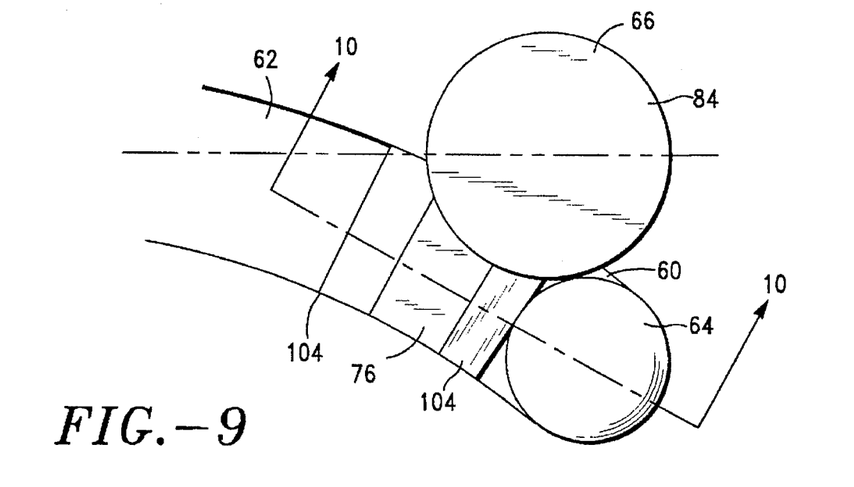
FIG. 9 is a detailed view of the encircled portion of FIG. 8.

FIG. 9 illustrates in an enlarged view, the encircled portion 108 of FIG. 8 having the lock guide 62 positioned adjacent the lock hole 60. The spacer 66 is positioned adjacent the lock pin 64. The linking member 76 has edges 104. The edges 104 lie adjacent to the lock hole 60 and the lock 62 respectively. The lock pin 64 inserts into the lock hole 60 to lock the handle 28 in the folded position as seen in FIG. 3.

Figure 10:
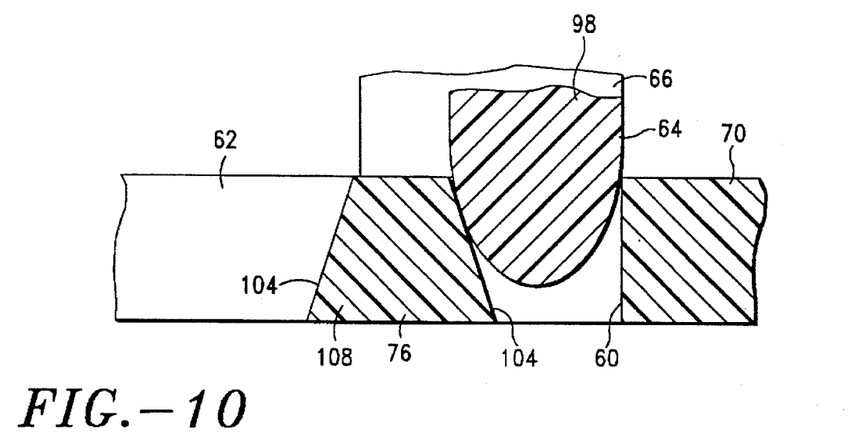
FIG. 10 is a cross-sectional view of the linking member and the lock and the lock guide of FIG. 9 as seen along the line 10—10 looking in the direction of the arrows.

FIG. 10 illustrates the interaction of the lock pin 64 with the linking member 76 of FIG. 9. The linking member 76 has trapezoidal cross-section 108. The edges 104 of the linking member are beveled.

Figure 11:
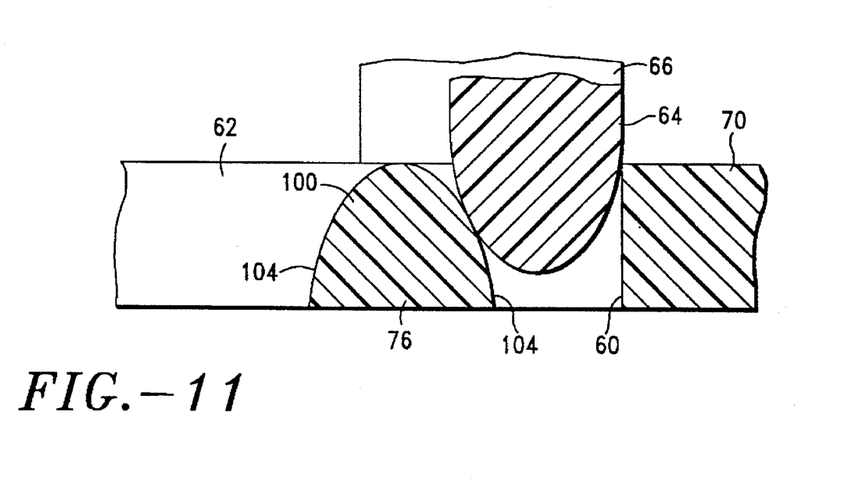
FIG. 11 is a cross-sectional view of a variation of the linking member of FIG. 9 as seen along the line 10—10 looking in the direction of the arrows.

FIG. 11 illustrates the interaction of the lock pin 64 with a variation of the linking member 76 of FIG. 9. The lock pin 64 has a rounded surface 98 and parabolic cross-section. The linking member 76 has a smooth surface 100 and a parabolic cross-section. The surface 100 of the linking member 76 guide the lock pin 64 into the lock hole 60.

It will be appreciated that although a lock pin 64 is shown, alternative configurations of the locking member 59 can be used in accordance with the present invention.

While the foregoing detailed description has described several embodiments of the carrier 20 and the handle 28 of the present invention, it is to be understood that the above description is illustrative only and not limiting of the disclosed invention. It will be appreciated that it would be possible to modify the present invention to accommodate not only a memory storage device 44, but also a variety of other electrical devices such as computer components. Additionally, the biasing member 92 may rely on a single spacer, or the spacers 66 and 68 may take alternate forms. Also, the linking member 76 may include a variety of shapes.

We claim:

1. A carrier for connecting an electrical device with electrical equipment having a slide, the carrier comprising:

a base for holding the electrical device;

a folding handle having two arms, each arm having an end rotatably attached to the carrier to enable rotation of the handle from an upright position to a folded position;

a cam member attached to each arm for urging against the slide when the handle rotates to move the carrier into and out from the slide, the cam member includes a locking member having a lock pin;

a lock guide formed on the base for guiding the locking member, the lock guide includes a linking member with a rounded surface and a pair of lock holes, the lock guide guides the locking member during rotation of the handle, the lock pin engages the rounded surface of the linking member to flex the handle arms apart and to guide the lock pin into a lock hole to lock the handle with respect to the carrier.

2. A carrier for connecting an electrical device with electrical equipment having a slide, the carrier comprising:

a base for holding the electrical device;

a folding handle having two arms, each arm having an end rotatably attached to the carrier to enable rotation of the handle from an upright position to a folded position;

a cam member attached to each arm for urging against the slide when the handle rotates to move the carrier into and out from the slide, the cam member includes a locking member;

a lock guide formed on the base for guiding the locking member, the lock guide includes a linking member with beveled edges, the lock guide guides the locking member during rotation of the handle, the locking member engages the beveled edges of the linking member to flex the handle arms apart and to guide the locking member with the lock guide to lock the handle with respect to the carrier.

* * * * *